(12) United States Patent
McCormick et al.

(10) Patent No.: US 12,503,027 B2
(45) Date of Patent: Dec. 23, 2025

(54) COOLER FOR A VEHICLE

(71) Applicant: NISSAN NORTH AMERICA, INC., Franklin, TN (US)

(72) Inventors: Matthew McCormick, Farmington Hills, MI (US); Samuel Cates, Nashville, TN (US); Vishnu Jayamohan, Nashville, TN (US); Andrew Molnar, Nashville, TN (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 399 days.

(21) Appl. No.: 17/683,289

(22) Filed: Feb. 28, 2022

(65) Prior Publication Data
US 2023/0271539 A1    Aug. 31, 2023

(51) Int. Cl.
*B60R 5/04* (2006.01)
*B60N 3/10* (2006.01)
*B60R 11/00* (2006.01)
*F25D 3/06* (2006.01)

(52) U.S. Cl.
CPC .............. *B60N 3/103* (2013.01); *B60R 5/044* (2013.01); *F25D 3/06* (2013.01); *B60R 2011/0029* (2013.01)

(58) Field of Classification Search
CPC .............. B65D 81/3818; B65D 81/382; B65D 81/3823; B65D 81/3816; B65D 81/3813; B60R 5/04; B60R 5/044; B60R 7/02; B60R 7/04; B60R 2011/0029; B60R 2011/0036; B60N 3/103; F25D 3/06; F25D 3/08

USPC .............................................. 296/37.6, 37.14
See application file for complete search history.

(56) References Cited

U.S. PATENT DOCUMENTS

| | | | | |
|---|---|---|---|---|
| 3,259,086 A | * | 7/1966 | Stein | F23M 5/06 110/340 |
| 3,979,007 A | * | 9/1976 | Thornbloom, Jr. | B65D 25/2841 220/756 |
| 4,095,711 A | * | 6/1978 | Conley | B65D 25/2841 220/766 |
| 4,502,715 A | * | 3/1985 | Lundblade | E05C 3/162 292/78 |
| RE32,740 E | * | 8/1988 | Steffes | A45C 11/20 312/351 |
| 4,775,072 A | * | 10/1988 | Lundblade | A45C 13/26 220/766 |
| 4,889,257 A | * | 12/1989 | Steffes | A45C 5/00 220/815 |
| 5,636,890 A | * | 6/1997 | Cooper | B60R 7/02 29/401.1 |
| 6,073,789 A | * | 6/2000 | Lundblade | F25D 23/02 220/4.23 |

(Continued)

*Primary Examiner* — Gregory A Blankenship
(74) *Attorney, Agent, or Firm* — Global IP Counselors, LLP

(57) ABSTRACT

A vehicle includes a vehicle storage area and a cooler. The vehicle storage area has a floor panel. The cooler is removably stowed in the storage area at a position underneath the floor panel. The cooler has a base defined by a front wall, a rear wall and a pair of sidewalls. The front wall has a vehicle forward facing surface. The rear wall has a vehicle rearward facing surface. The pair of sidewalls connect the front and rear walls. The cooler further has a lid that is pivotable with respect to the base at a location that is rearward of the vehicle forward facing surface.

19 Claims, 8 Drawing Sheets

(56) References Cited

U.S. PATENT DOCUMENTS

| | | | |
|---|---|---|---|
| 6,241,137 B1* | 6/2001 | Corr | B60R 9/00 |
| | | | 224/539 |
| 7,488,024 B1* | 2/2009 | Medlar | B60R 5/04 |
| | | | 296/37.16 |
| 8,029,038 B2* | 10/2011 | Woodhouse | B60N 2/3095 |
| | | | 296/65.01 |
| 8,231,164 B2* | 7/2012 | Schubring | B60R 7/04 |
| | | | 296/193.07 |
| 11,130,434 B2 | 9/2021 | Ernst | |
| 11,754,332 B2* | 9/2023 | Guan | F25D 11/003 |
| | | | 62/135 |
| 11,913,713 B2* | 2/2024 | Guan | F25D 29/005 |
| 12,044,467 B2* | 7/2024 | Thelin | B65D 81/3813 |
| 2002/0070574 A1* | 6/2002 | Carlsson | B60R 7/02 |
| | | | 296/37.14 |
| 2009/0184536 A1* | 7/2009 | Kubota | B62D 25/10 |
| | | | 296/65.09 |
| 2013/0334238 A1* | 12/2013 | Goforth | A47J 41/0088 |
| | | | 220/772 |
| 2015/0102624 A1* | 4/2015 | Kmita | B62D 33/04 |
| | | | 296/37.6 |
| 2017/0291553 A1* | 10/2017 | Hellman | B60N 3/104 |
| 2019/0152677 A1* | 5/2019 | Hoyt | B65D 81/2038 |
| 2020/0269894 A1* | 8/2020 | Cohen | B62B 3/04 |
| 2021/0102409 A1* | 4/2021 | Seiders | B65D 55/02 |
| 2021/0285716 A1* | 9/2021 | Kalajyan | B65D 25/20 |
| 2023/0271539 A1* | 8/2023 | McCormick | B60R 5/044 |
| | | | 296/24.35 |

* cited by examiner

COOLER FOR A VEHICLE

BACKGROUND

Field of the Invention

The present invention generally relates to a cooler for a vehicle. More specifically, the present invention relates to a cooler for a vehicle that can be removably stowed in a vehicle sub-floor compartment.

Background Information

Vehicles can be provided with one or more coolers that are stored in the vehicle. Conventional vehicle coolers are stored in the vehicle's main cargo area or in the passenger compartment. Conventional vehicle coolers also typically require energy powered from the vehicle to keep the contents cool.

SUMMARY

In view of the state of the known technology, one aspect of the present disclosure is to provide a vehicle comprising a vehicle storage area and a cooler. The vehicle storage area has a floor panel. The cooler is removably stowed in the storage area at a position underneath the floor panel. The cooler has a base defined by a front wall, a rear wall and a pair of sidewalls. The front wall has a vehicle forward facing surface. The rear wall has a vehicle rearward facing surface. The pair of sidewalls connect the front and rear walls. The cooler further has a lid that is pivotable with respect to the base at a location that is rearward of the vehicle forward facing surface.

In view of the state of the known technology, one aspect of the present disclosure is to provide a cooler for a vehicle comprising a base and a lid. The base has a cooler storage area defined by a front wall, a rear wall and a pair of sidewalls. The front wall has a vehicle forward facing surface. The rear wall has a vehicle rearward facing surface. The pair of sidewalls connects the front and rear walls. The lid is pivotable with respect to the base at a location between the vehicle forward facing surface and an opening of the cooler storage area.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
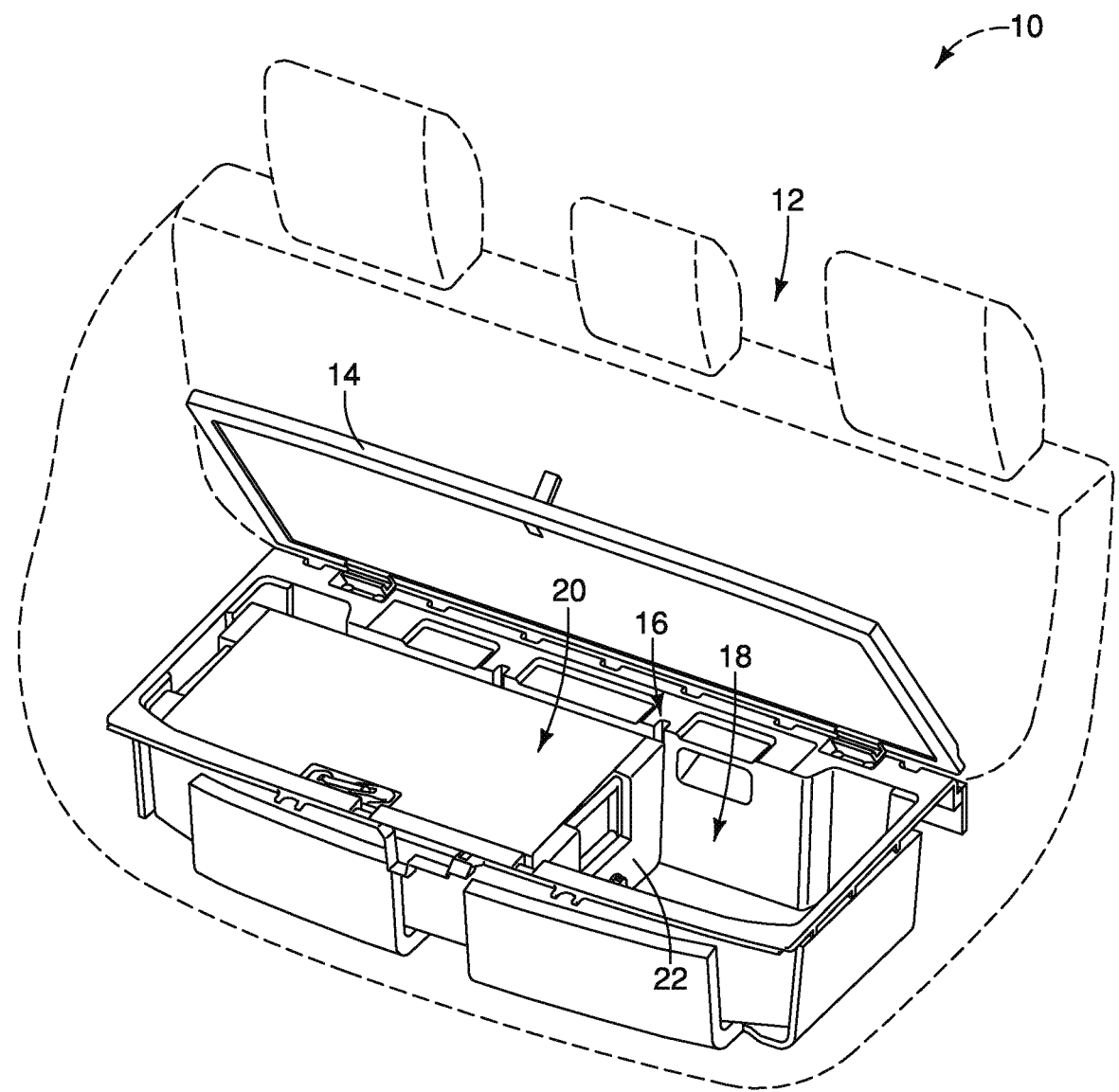
FIG. 1 is a perspective view of a main cargo area of a vehicle that is equipped with a cooler stored in a sub-floor compartment of the vehicle in accordance with an illustrated embodiment.

Referring initially to FIG. 1, a vehicle 10 having a vehicle storage area 12 is illustrated in accordance with an illustrated embodiment. The vehicle storage area 12 is a rear storage area that is a main cargo area of the vehicle 10 located behind the vehicle's 10 rear seats. The rear storage area is accessible from the vehicle's 10 rear hatch (not shown). The rear storage area has a floor panel 14 that is openable between a closed and an open state to a tool storage area that is disposed underneath the floor panel 14. As shown, the vehicle 10 includes a lug box 16 that is provided with the vehicle 10 inside the tool storage area. The stool storage area having the lug box 16 is considered a sub-floor compartment 18 of the vehicle 10.

As shown, the vehicle 10 further comprises a cooler 20 in accordance with an illustrated embodiment. More particularly, the cooler 20 is provided with the vehicle 10. The cooler 20 is designed to be provided for removable storage inside the sub-floor compartment 18 that is an area underneath the floor panel 14. More specifically, the cooler 20 is stored inside the lug box 16 within the sub-floor compartment 18 of the vehicle 10. Preferably, the cooler 20 is designed to be stacked and stowed away inside the lug box 16. Therefore, the cooler 20 is sized and dimensioned for a snug fit inside the lug box 16. The lug box 16 has a lid 40 (not shown) that can enclose the cooler 20 inside the lug box 16, as will be further described below. As the vehicle 10 includes electrical wiring beneath the sub-floor compartment 18 of the vehicle 10, the cooler 20 is designed to be water-tight, as will be further described below.

While the cooler 20 is illustrated as being provided with a sports utility type vehicle, it will be apparent to those skilled in the vehicle field from this disclosure that the cooler 20 can be provided with other types of vehicles, such as sedans and/or trucks. Further, while the cooler 20 is designed for easy storage inside the vehicle's 10 sub-floor compartment 18, it will also be apparent to those skilled in the vehicle field from this disclosure that the cooler 20 can be provided to be stowed in other locations, such as center consoles, glove boxes or lug side compartments.

Conventional vehicle sub-floor lug boxes or storage devices are not removable, watertight, drain 46 able or insulated. Further, conventional vehicle coolers are not removable from the vehicle, drain 46 able, and typically require continuous vehicle power to remain chilled. With the cooler 20 of the illustrated embodiment that is designed to be snugly stored at a location beneath the vehicle floor panel 14, the cooler 20 will not obstruct the main cargo area of the vehicle 10 or the vehicle's 10 passenger compartment. Further, the cooler 20 of the illustrated embodiment is designed to not require vehicle power to chill the items inside the cooler 20. The cooler 20 is sized and dimensioned for snug fit inside the lug box 16 such that the contents inside the cooler 20 be better maintained during driving. As the cooler 20 is removable, the cooler 20 can be accessed from behind the rear hatch and removed to be taken outside the vehicle 10.

Referring now to FIGS. 2 to 6, the cooler 20 has a base 22 having a cooler storage area 24 defined by a front wall 26, a rear wall 28 and a pair of first and second sidewalls 30 and 32. The base 22 also includes a bottom 33 wall that defines the cooler storage area 24 with the front, rear and the first and second sidewalls 30 and 32. The front wall 26 has a vehicle forward facing surface 34 that faces in a vehicle forward direction when the cooler 20 is stored in the sub-floor compartment 18. The rear wall 28 having a vehicle rearward facing surface 36 that faces in a vehicle rearward direction when the cooler 20 is stored in the sub-floor compartment 18.

Figure 3:
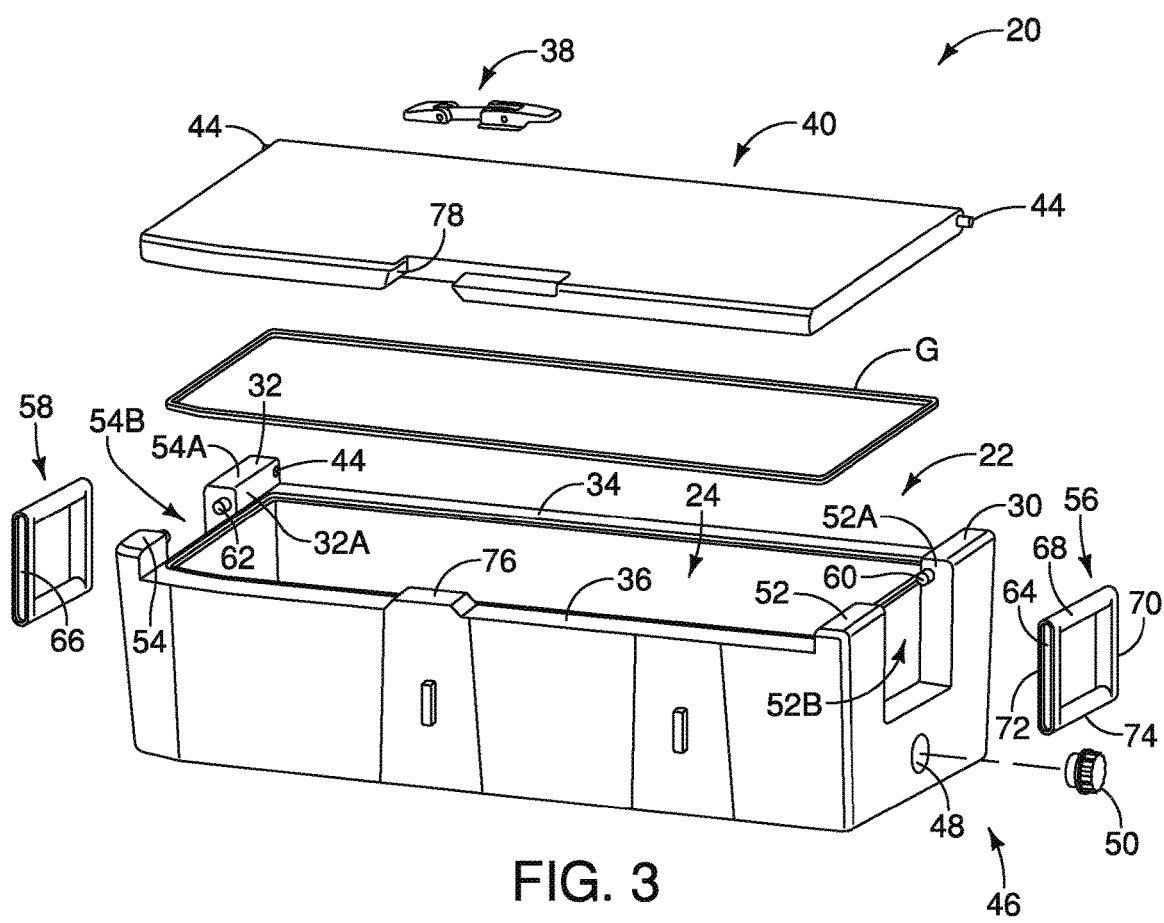
FIG. 3 is an exploded view of the cooler.

The cooler 20 includes a latch 38 that is positioned at the rear wall 28. In particular, the latch 38 is located at a top surface of rear wall 28, as will be further discussed. The pair of first and second sidewalls 30 and 32 connect the front and rear walls 26 and 28. As shown in FIG. 3, the first and second sidewalls 30 and 32 are taller with respect to the front and rear walls 26 and 28. That is, the front and rear walls 26 and 28 are indented with respect to the first and second sidewalls 30 and 32. The cooler 20 further has a lid 40 that is pivotable with respect to the base 22 at a location that is rearward of the vehicle forward facing surface 34 of the front wall 26, as will be further discussed.

Figure 10:
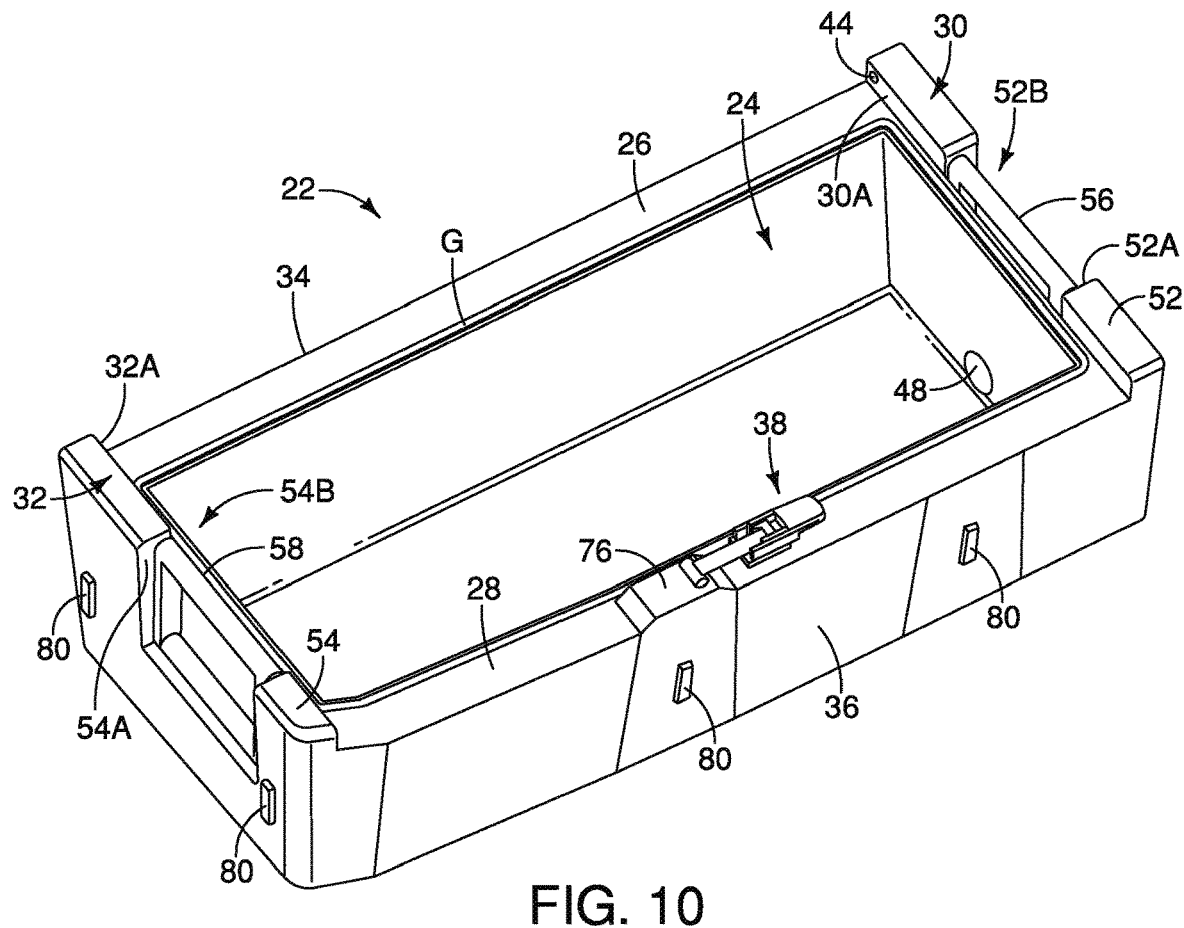
FIG. 10 is a perspective view of a base of the cooler with the lid removed.

As shown in FIGS. 3 and 10, the cooler 20 further includes a pair of hinge pins 42 that are received by a pair of hinge openings 44 provided at the first and second sidewalls 30 and 32. The hinge openings 44 are provided at a pair of interior facing surfaces 30A and 32A of the first and second sidewalls 30 and 32. The interior facing surfaces 30A and 32A face the each other. Preferably, the hinge openings 44 of the interior facing surfaces 30A and 32A are located at an area that is adjacent to the front wall 26 of the base 22. The lid 40 rotates about the hinge pins 42. Therefore, the lid 40 is pivotable about the first and second sidewalls 30 and 32 of the base 22.

Figure 4:
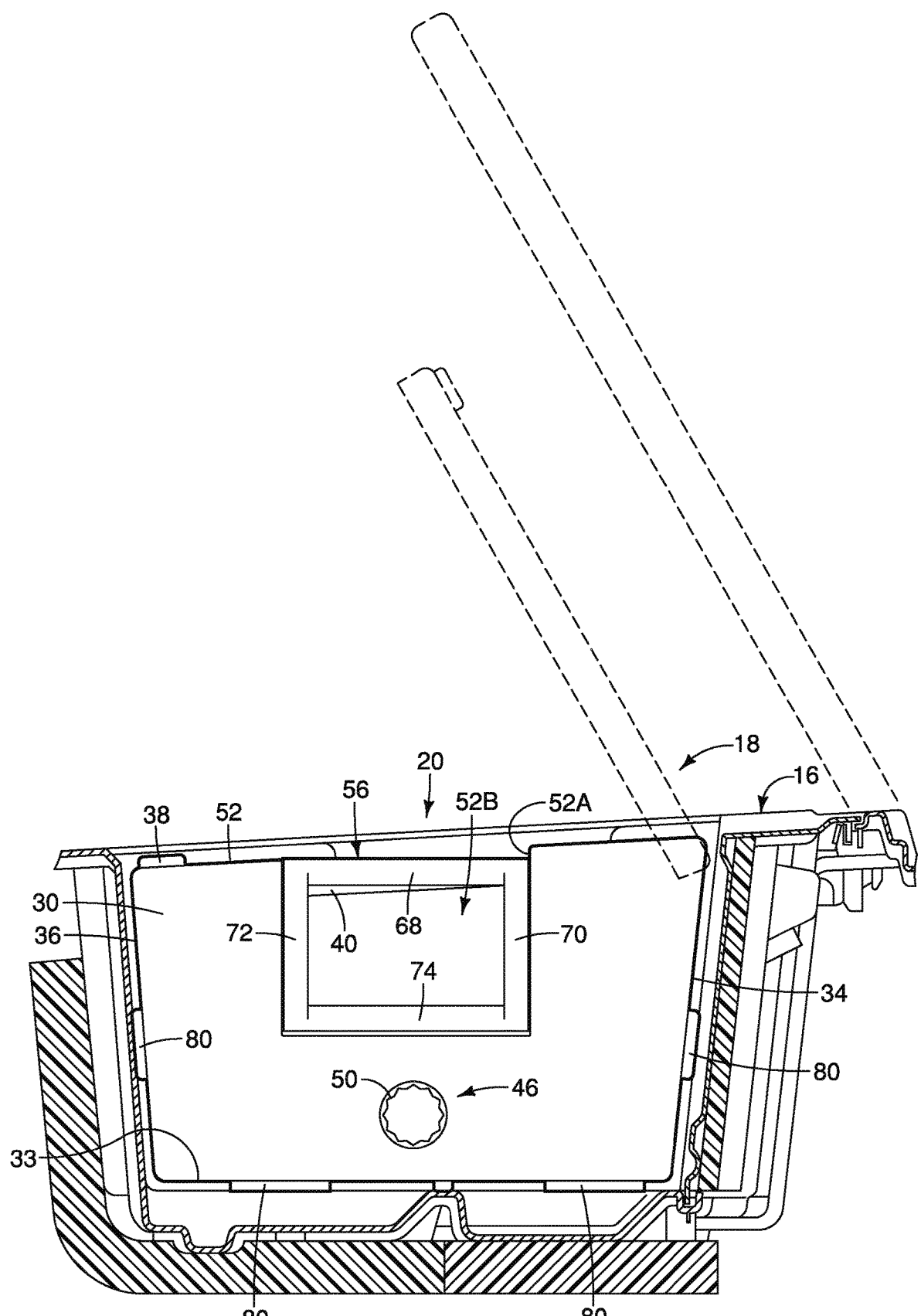
FIG. 4 is a cross-sectional view of the sub-floor compartment having the cooler stored therein.
Figure 5:
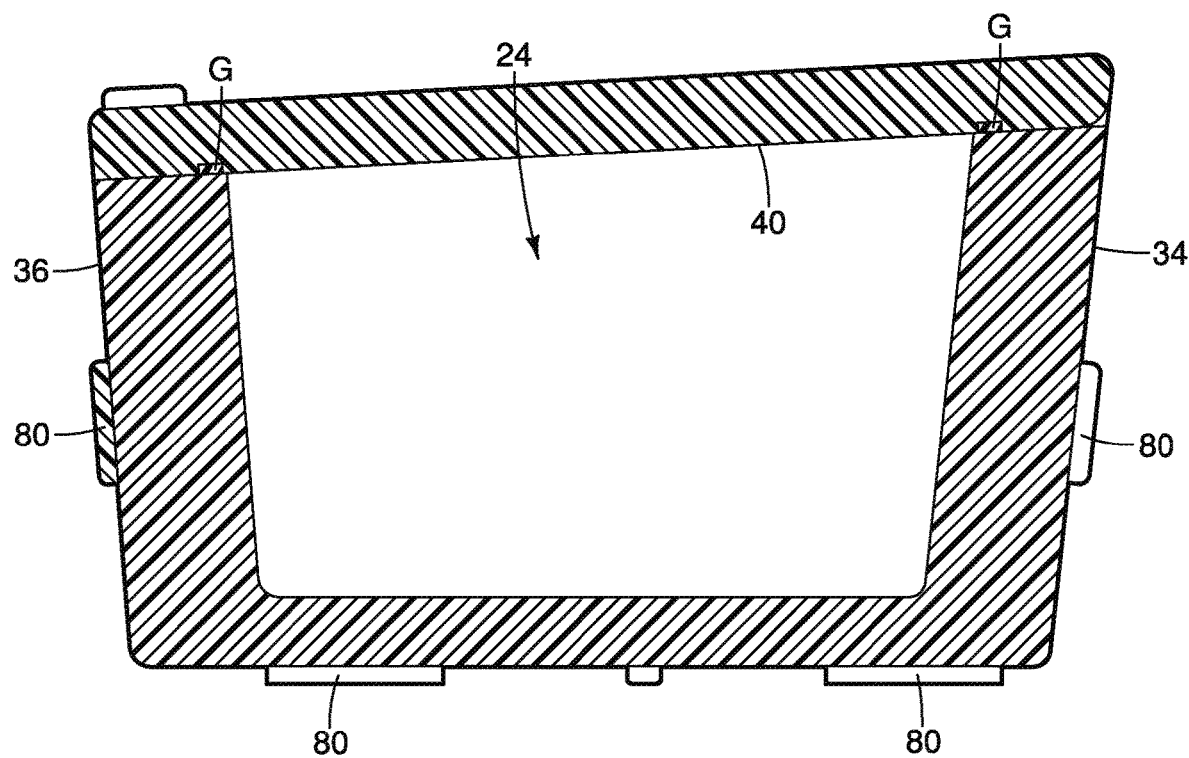
FIG. 5 is a cross-sectional view of the cooler.

Thus, the cooler 20 is configured such that the lid 40 pivots in a direction towards the vehicle front area (i.e., in the forward direction) when the lid 40 opens. As best seen in FIGS. 4 and 5, the cooler 20 is designed such that the lid 40 angles downward in the rearward direction as the cooler 20 sits in the lug box 16 to help accessibility of the cooler 20 contents when the cooler 20 is still stowed in the sub-floor compartment 18.

As best seen in FIG. 3, the cooler 20 includes a drain 46 provided at one of the first and second sidewalls 30 and 32. As shown, the drain 46 is provided at the first sidewall 30. However, it will be apparent to those skilled in the vehicle field from this disclosure that the drain 46 can be provided by either one of the first and second sidewalls 30 and 32. Thus, the first sidewall 30 includes the drain opening 48 that leads into the cooler storage area 24. The drain 46 further includes a plug 50 that is removably coupled to the drain opening 48. Thus, the drain opening 48 can include threads that mate with corresponding threads of the plug 50. The drain 46 is provided to empty the cooler 20 of water or fluid to help keep the cooler 20 clean by removing the cooler 20 to drain 46 the cooler 20.

Referring to FIGS. 6 to 10, the first sidewall 30 includes a first top surface 52 with a first opening 52A that leads to a first receptacle 52B. The second sidewall 32 of the pair of sidewalls includes a second top surface 54 with a second opening 54A that leads to a second receptacle 54B. The first and second top surfaces face the floor panel 14 when the cooler 20 is disposed in the sub-floor compartment 18. As shown, the cooler 20 further includes a first handle 56 pivotally disposed in the first receptacle 52B of the first sidewall 30. The cooler 20 further includes a second handle 58 pivotally disposed in the second receptacle 54B of the second sidewall 32.

Figure 7:
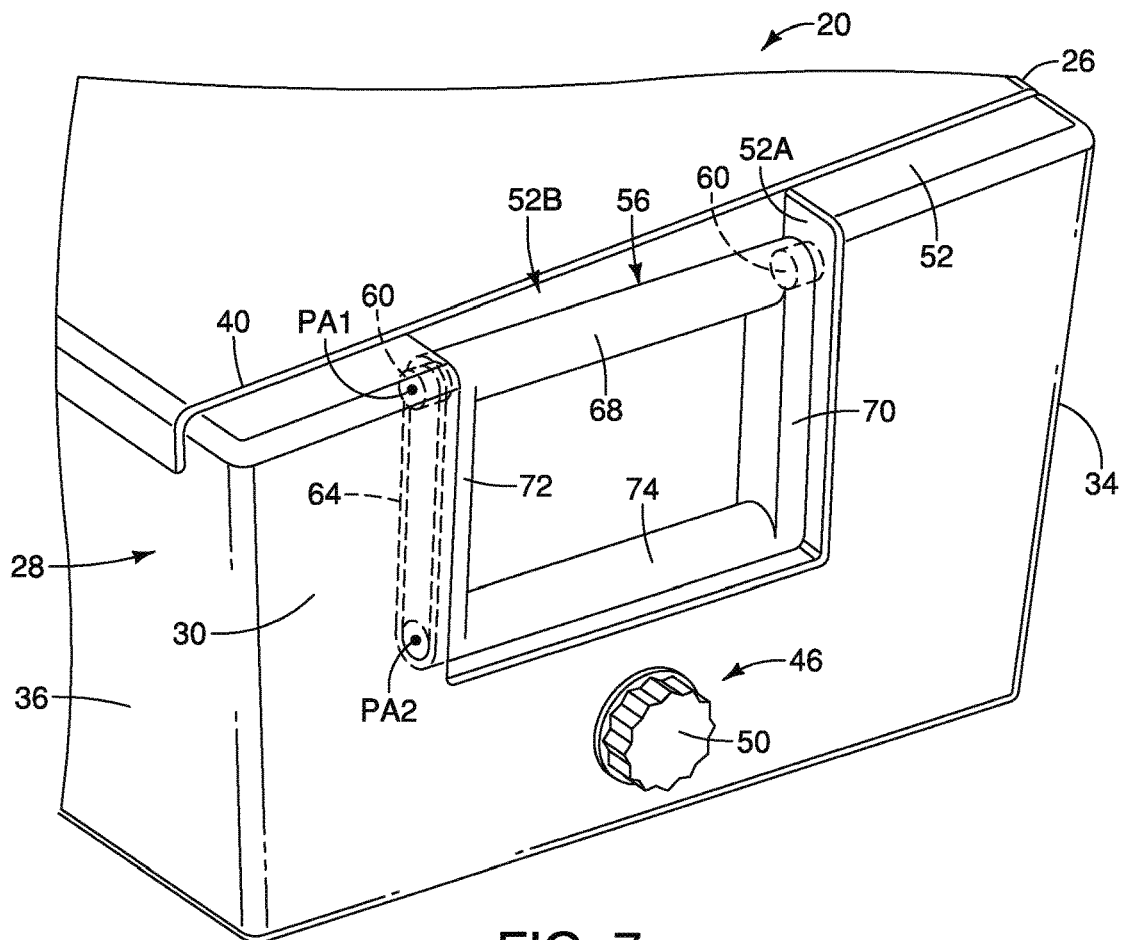
FIG. 7 is a partial perspective view of a side of the cooler.
Figure 8:
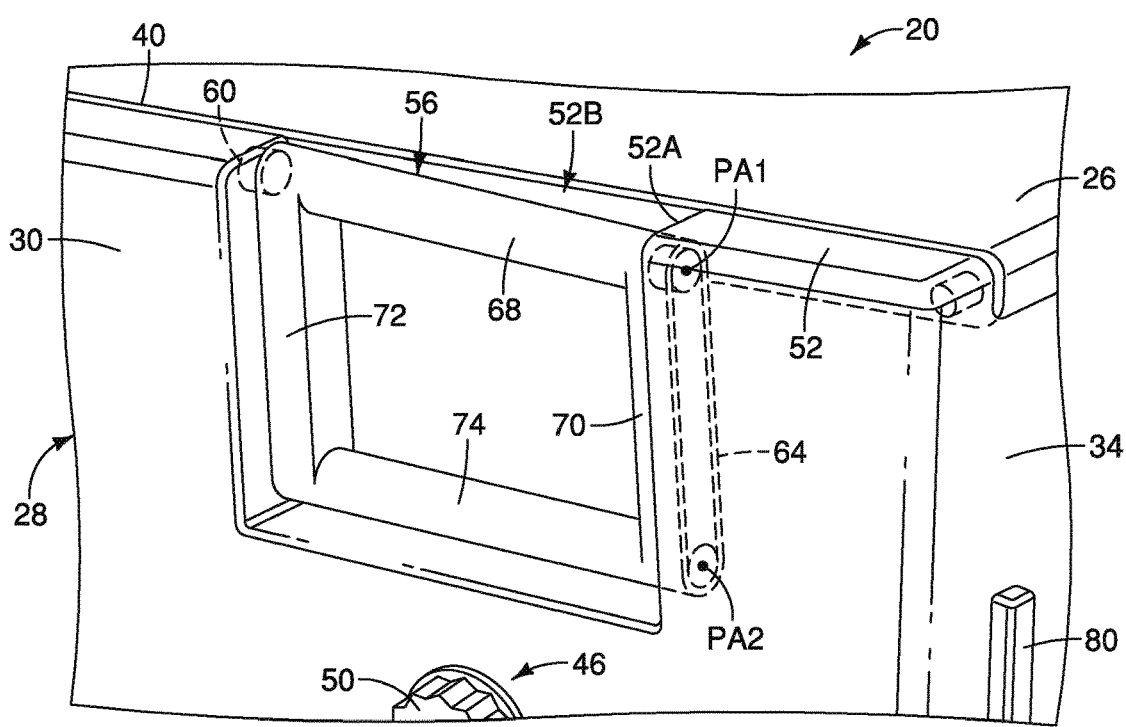
FIG. 8 is another partial perspective view of the side of the cooler.
Figure 9:
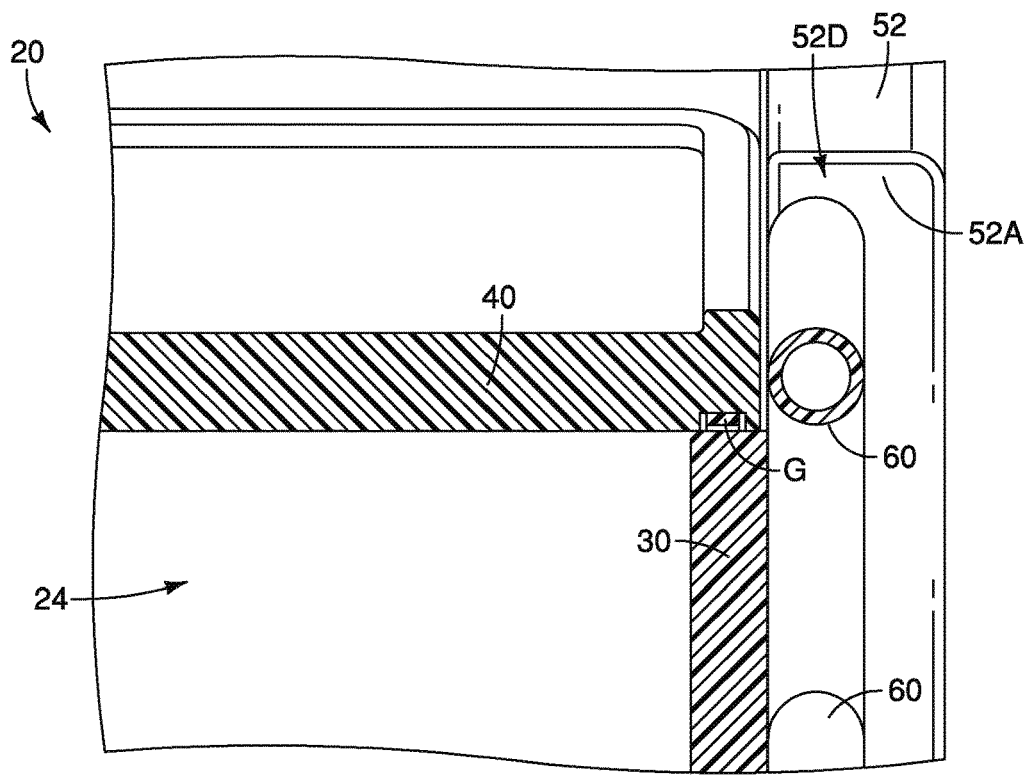
FIG. 9 is a cross-sectional view of a top of the cooler.

As shown in FIGS. 7 and 8, the first receptacle 52B includes at least one first spindle 60 operatively coupled to the first handle 56. Preferably, the first receptacle 52B includes a pair of first spindles 60 operatively coupled to the first handle 56. The second receptacle 54B includes at least one second spindle 62 operatively coupled to the second handle 58. Preferably, the second receptacle 54B includes a pair of second spindles 62 operatively coupled to the second handle 58. The first and second spindles 60 and 62 are preferably circular protrusions extending from the first and second receptacles 52B and 54B. The first and second spindles 60 and 62 define rods or pins serving as pivot axes for the first and second handles 56 and 58. In the illustrated embodiment, the first and second handles 56 and 58 can also slide along and pivot about the first and second spindles 60 and 62, as will be further described below.

Referring again to FIG. 3, the lid 40 is designed to rotate at a pivot point P rearward of the vehicle forward facing surface 34 in order to prevent interference of the lid 40 with the lug box 16. Thus, the lid 40 has the pivot point P that is located inward of the outermost edge of the base 22. In this way, the lid 40 can be opened and closed even while the cooler 20 is still inside the lug box 16. As shown, the hinge pins 42 are provided to the lid 40 to be received by the hinge openings 44 of the sidewalls 30 and 32. That is, the lid 40 is preferably made having the hinge pins 42 integrally formed thereon. However, it will be apparent to those skilled in the vehicle field from this disclosure that the hinge pins 42 can be separately provided to the lid 40.

The lid 40 extends between the first and second sidewalls 30 and 32 to cover the cooler storage area 24 when the lid 40 is closed. In particular, the lid 40 does not extend across the entirety of a top of the cooler 20 as the front and rear walls 26 and 28 are recessed with respect to the first and second sidewalls 30 and 32. That is, the top of the cooler 20 is defined by both the lid 40 and the first and second sidewalls 30 and 32. In particular, the lid 40 includes a pair of side surfaces 40A that faces the interior facing surfaces 30A and 32A of the first and second sidewalls 30 and 32. The hinge pins 42 are provided at the side surfaces of the lid 40. The lid 40 preferably lines up flush with the top surfaces of the first and second sidewalls 30 and 32 when the lid 40 is closed. As the pivot point for the lid 40 is disposed rearward of the forward facing surface of the base 22, the lid 40 can be opened and closed while the cooler 20 is still stowed.

Figure 11:
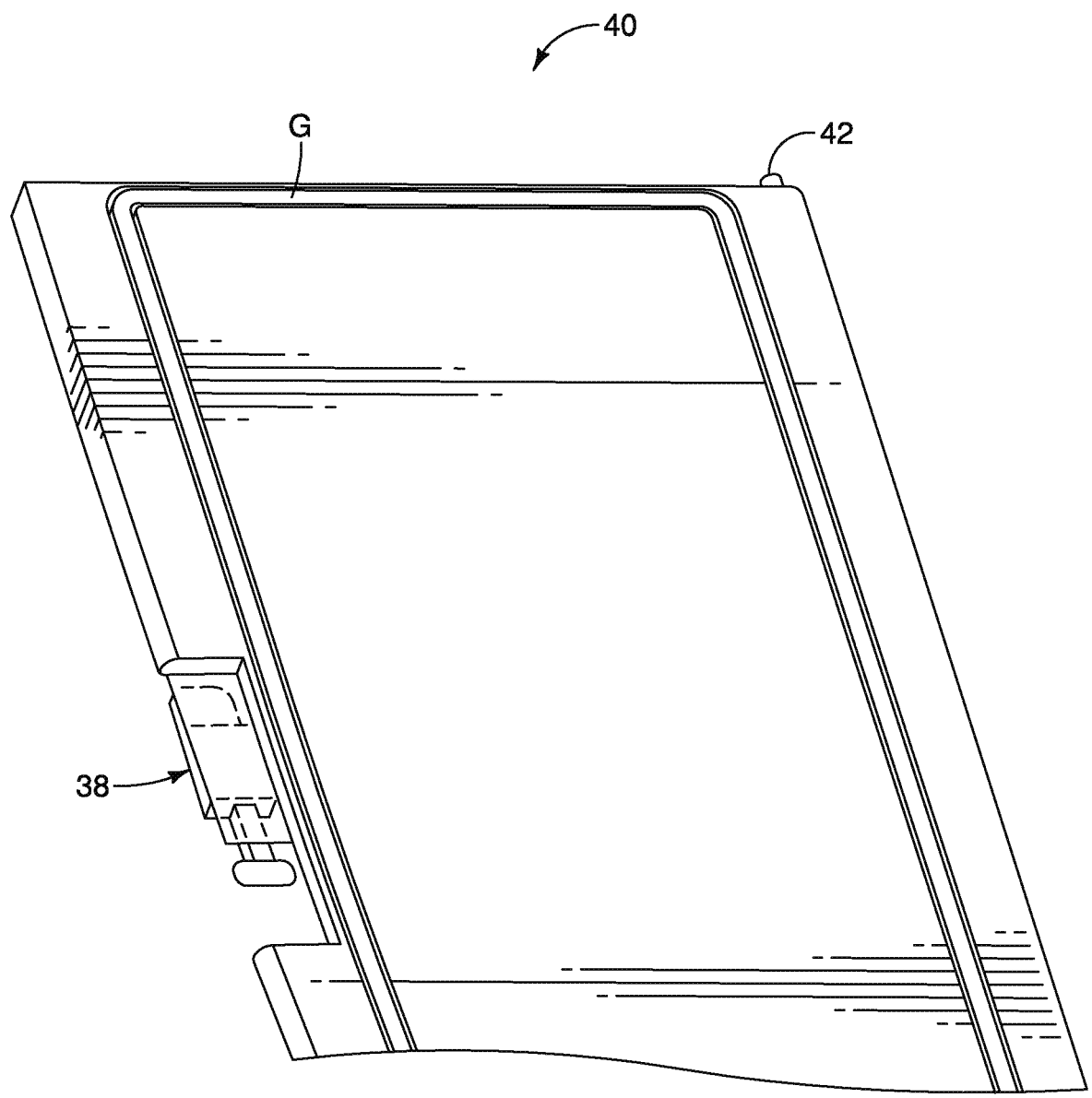
FIG. 11 is a partial perspective view of an underside of the lid of the cooler.

As seen in FIGS. 3, 10 and 11, cooler 20 preferably further includes a gasket G that is disposed on the base 22. In particular, the gasket G is provided to the base 22 and to the lid 40, which has an interior recess for receiving the gasket G, as seen in FIG. 11. The gasket G is made from an elastic material, such as rubber. The gasket G can be fitted to the interior recess of the lid 40 by interference fit. The gasket G dampens the impact of between the base 22 and the lid 40 during operation of the lid 40.

Referring to FIGS. 7 and 8, the first and second handles 56 and 58 will be further discussed. The first and second handles 56 and 58 are movable between a stowed position and an operated position. The first and second handles 56 and 58 sit within the first and second receptacles 52B and 54B when they are in the stowed position. The first and second handles 56 and 58 extend out from the first and second receptacles 52B and 54B when in the operated position.

The first handle 56 includes at least one first slot 64 that receives the first spindles 60. In particular, the first handle 56 includes a pair of first slots 64 that each receive one of the first spindles 60. The second handle 58 includes at least one second slot that receives the second spindles 62. In particular, the first handle 56 includes a pair of second slots 66 that each receive one of the second spindles 62. The first and second slots 64 and 66 are elongated recesses along the sides of the first and second handles 56 and 58. The first and second handles 56 and 58 slides along the first and second spindles 60 and 62 at the first and second slots 64 and 66, respectively when moving between the stowed position and the operated position. Therefore, the first handle 56 is slidable with respect to the base 22 along the first slots 64. The second handle 58 is slidable with respect to the base 22 along the second slots 66.

Additionally, the first and second handles 56 and 58 can pivot at the first and second spindles 60 and 62 directly to operate the first and second handles 56 and 58. That is, instead of sliding the first and second handles 56 and 58 upward, the first and second handles 56 and 58 can pivot at the spindles 60 and 62 to be operated. Therefore, the first and second handles 56 and 58 are arranged with respect to the base 22 using a pin and sleeve design between the first and second slots 64 and 66 and the spindles 60 and 62. Thus, the first and second handles 56 and 58 are telescopically recessed with respect to the first and second receptacles 52B and 54B. As the first and second handles 56 and 58 are identical except for their location on the base 22, only the first handle 56 will be discussed for brevity.

The first handle 56 includes a first shaft portion 68, a second shaft portion 70, a third shaft portion 72 and a fourth shaft portion 74. The first shaft portion 68 defines a "top" shaft when the first handle 56 is in the stowed position. The second shaft portion 70 defines a "bottom" shaft when the first handle 56 is in the stowed position. The first and second shaft portions 68 and 70 extend parallel with respect to each other. The third and fourth shaft portions 72 and 74 connect the first and second shaft portions 68 and 70. The third and fourth shaft portions 72 and 74 extend parallel with respect to each other, and perpendicularly with respect to the first and second shaft portions 68 and 70. The third and fourth shaft portions 72 and 74 include the first slots 64. Therefore, the first handle 56 slides with respect to the first spindles 60 at the third and fourth shaft portions 72 and 74.

The first shaft portion 68 sits on the first spindles 60 when the first handle 56 is in the stowed position. As stated, the first handle 56 slides along the first spindle 60 at the first slots 64 such that the second shaft portion 70 receives the first spindles 60 in the operated position. Therefore, the first and second handles 56 and 58 can slide directly upward out of the first and second receptacles 52B and 54B to lift the cooler 20 from the sub-floor compartment 18 by the first and second handles 56 and 58. Alternatively, the first handle 56 can directly pivot at the first spindles 60 either at the first shaft portion 68 or the second shaft portion 70.

The first handle 56 includes a first pivot point PA1 (at the first shaft portion 68) and a second pivot point PA2 (at the second shaft portion 70). The first and second pivot points PA1 and PA2 are disposed at opposite ends of the first handle 56 with respect to each other. Thus, the first handle 56 is pivotable with respect to the base 22 at the first and second pivot points PA1 and Pa2. Similarly, the second handle 58 includes a first pivot point and a second pivot point that are disposed at opposite ends of the second handle 58 with respect to each other. The second handle 58 is pivotable with respect to the base 22 at the first and second pivot points.

With this configuration, the first and second handles 56 and 58 can be lifted from the base 22 by the sides so that the cooler 20 can be lifted from the lug box 16 even while the cooler 20 is snugly stored in the lug box 16. This allows the subfloor compartment to be fully used as a storage area.

Figure 2:
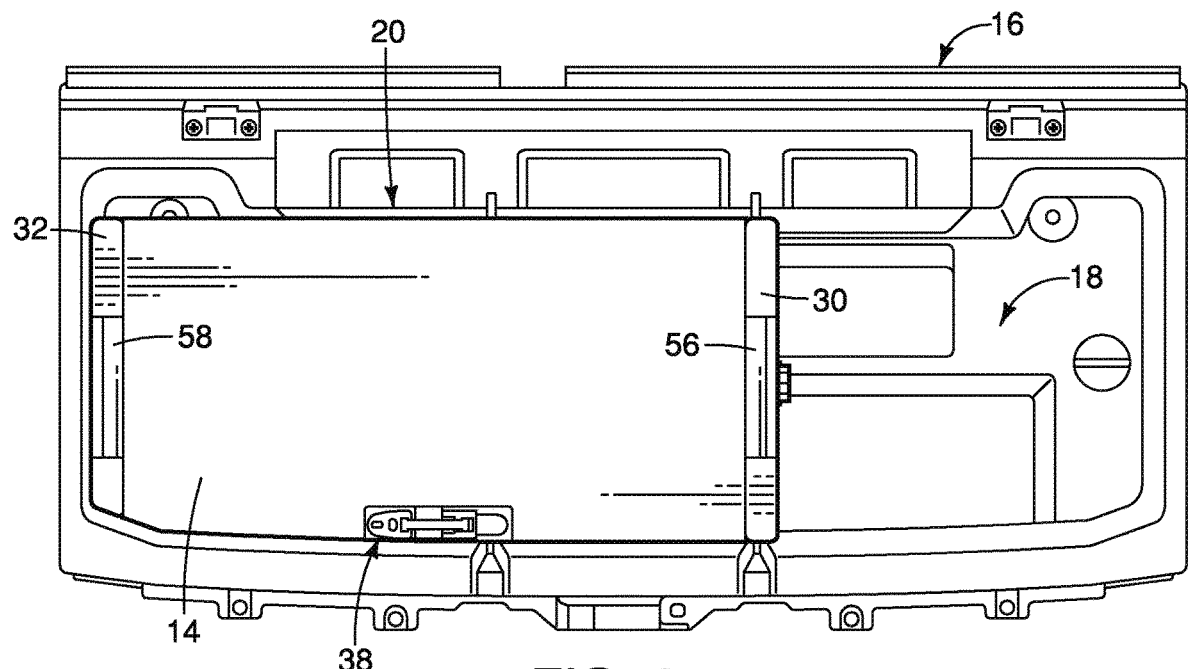
FIG. 2 is a top plan view of the cooler stored in the sub-floor compartment.

Referring now to FIGS. 2 and 10, the latch 38 is positioned at the top of the cooler 20, rather than on the front or rear wall 28s. As best seen in FIG. 3, the rear wall 28 includes a raised portion 76 and the lid 40 includes a breakaway 78. The raised portion 76 is received by the breakaway 78 when the lid 40 is installed onto the base 22. The latch 38 of the illustrated embodiment is coupled to both the base 22 and the lid 40. In particular, the latch 38 is partially coupled to the raised portion 76 of the rear wall 28. The latch 38 is also partially coupled to a recessed portion of the lid 40 that is adjacent to the breakaway 78. That is, the latch 38 includes a stationary part and a rotatable part that moves with respect to the stationary part. Preferably, the stationary part is mounted to the raised portion 76 in a conventional manner, such as by fasteners. The rotatable part is rotatably coupled to the stationary part to extend from the stationary part to be latch 38ed to the lid 40 by snap-fit fasteners.

Figure 6:
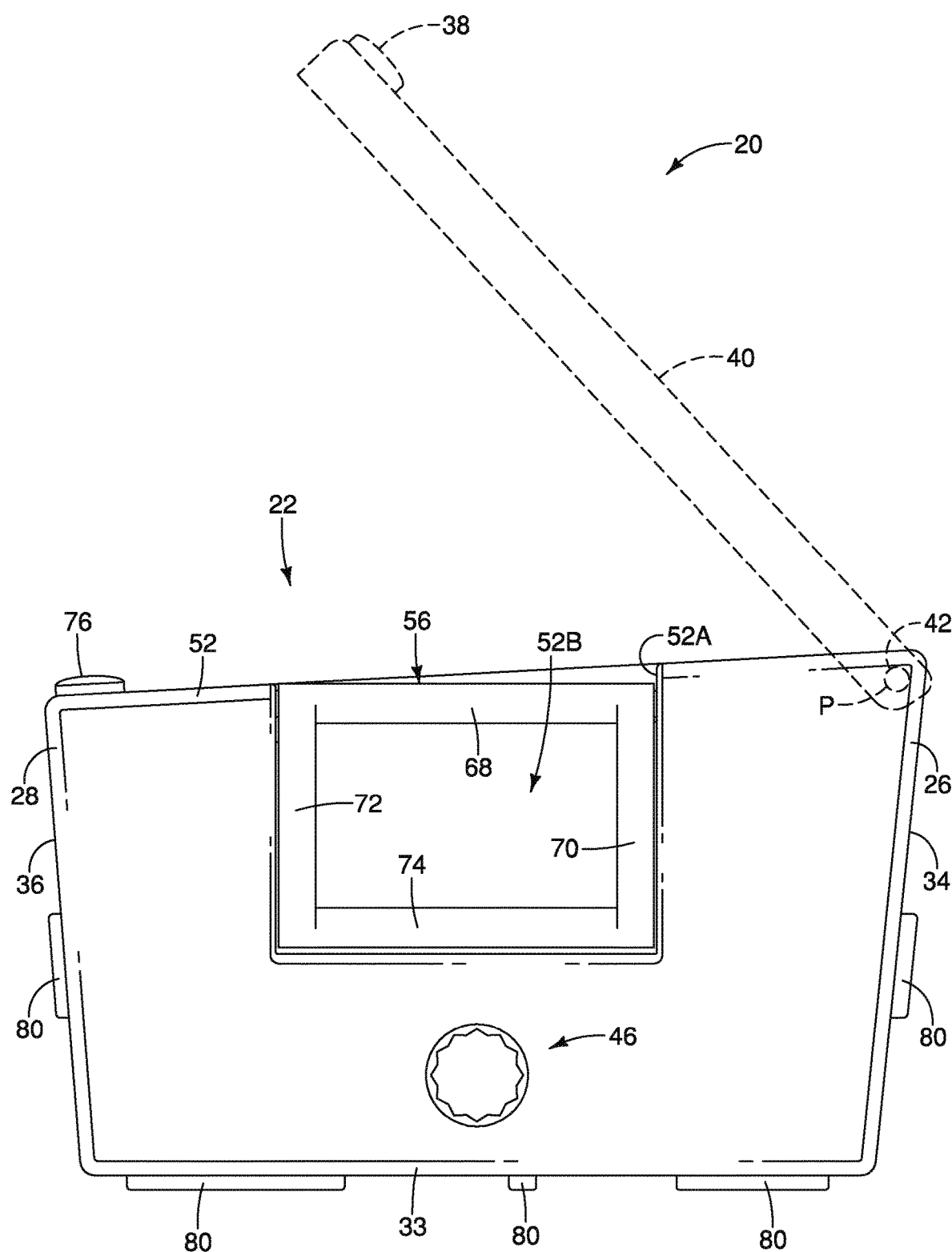
FIG. 6 is a side view of the cooler with a lid in dashed to depict an open state.

Referring to FIGS. 4 to 6, the cooler 20 preferably further includes a plurality of standoffs 80 disposed at and around the base 22. The standoffs 80 are a bumpers made of an elastic material such as rubber. The bumpers are to be made of any appropriate material that will prevent rattling noises and will allow the cooler 20 to slide in and out of the lug box 16 while not scratching the lug box 16. The standoffs 80 are provided for ease of storage in the lug box 16 while preventing scratches or damage to the cooler 20 while the cooler 20 is stored in the lug box 16. Therefore, the standoffs 80 are raised bumpers that enable a snug fit between the cooler 20 and the lug box 16 during vehicle use.

GENERAL INTERPRETATION OF TERMS

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the cooler. Accordingly, these terms, as utilized to describe the present invention should be interpreted relative to a vehicle equipped with the cooler.

The term "configured" as used herein to describe a component, section or part of a device that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle, comprising:
a vehicle storage area having a floor panel; and
a cooler removably stowed in the storage area at a position underneath the floor panel, the cooler having a base defined by a front wall having a vehicle forward facing surface, a rear wall having a vehicle rearward facing surface and a pair of sidewalls connecting the front and rear walls, the cooler further having a lid with a pivot point located inward of an outermost edge of the base, a first sidewall of the pair of sidewalls including a first top surface with a first opening that leads to a first receptacle having a depression on the first sidewall, the second sidewall of the pair of sidewalls including a second top surface with a second opening that leads to a second receptacle having a depression on the second sidewall,
the cooler further including a first handle pivotally disposed in the first receptacle and a second handle pivotally disposed in the second receptacle,
the cooler further comprising a pair of hinge pins received by a pair of openings in interior facing surfaces of the sidewalls, the lid rotating about the hinge pins and each of the openings having a shape that corresponds to a shape of the hinge pins, and
the rear wall including a raised portion that is received in a recessed portion of the lid, the raised portion being raised from a remaining portion of the rear wall.

2. The vehicle according to claim 1, wherein
the first receptacle includes at least one first spindle operatively coupled to the first handle, and the second receptacle includes at least one second spindle operatively coupled to the second handle.

3. The vehicle according to claim 2, wherein
the first handle includes at least one first slot that receives the at least one first spindle, the second handle includes at least one second slot that receives the at least one second spindle.

4. The vehicle according to claim 3, wherein
the first handle is slidable with respect to the base along the first slot, and the second handle is slidable with respect to the base along the second slot.

5. The vehicle according to claim 1, wherein
the first handle includes a first pivot point and a second pivot point disposed at opposite ends of the first handle with respect to each other, the first handle being pivotable with respect to the base at the first and second pivot points.

6. The vehicle according to claim 5, wherein
the second handle includes a first pivot point and a second pivot point disposed at opposite ends of the second handle with respect to each other, the second handle being pivotable with respect to the base at the first and second pivot points.

7. A cooler for a vehicle, comprising:
a base having a cooler storage area defined by a front wall having a vehicle forward facing surface, a rear wall having a vehicle rearward facing surface and a pair of sidewalls connecting the front and rear walls, a first sidewall of the pair of sidewalls including a first top surface with a first opening that leads to a first receptacle having a depression on the first sidewall, the second sidewall of the pair of sidewalls including a second top surface with a second opening that leads to a second receptacle having a depression on the second sidewall;
a first handle pivotally disposed in the first receptacle;
a second handle pivotally disposed in the second receptacle;
a lid with a pivot point located inward of an outermost edge of the base; and
a pair of hinge pins received by a pair of openings in interior facing surfaces of the sidewalls, the lid rotating about the hinge pins and each of the openings having a shape that corresponds to a shape of the hinge pins,
the rear wall including a raised portion that is received in a recessed portion of the lid, the raised portion being raised from a remaining portion of the rear wall.

8. The cooler according to claim 7, wherein
the first receptacle includes at least one first spindle operatively coupled to the first handle, and the second receptacle includes at least one second spindle operatively coupled to the second handle.

9. The cooler according to claim 8, wherein
the first handle includes at least one first slot that receives the at least one first spindle, the second handle includes at least one second slot that receives the at least one second spindle.

10. The cooler according to claim 9, wherein
the first handle is slidable with respect to the base along the first slot, and the second handle is slidable with respect to the base along the second slot.

11. The cooler according to claim 7, wherein
the first handle includes a first pivot point and a second pivot point disposed at opposite ends of the first handle with respect to each other, the first handle being pivotable with respect to the base at the first and second pivot points.

12. The cooler according to claim 11, wherein
the second handle includes a first pivot point and a second pivot point disposed at opposite ends of the second handle with respect to each other, the second handle being pivotable with respect to the base at the first and second pivot points.

13. The cooler according to claim 7, further comprising
a latch positioned at a top facing surface of the lid.

14. The vehicle according to claim 1, further comprising
a drain provided at the first sidewall or the second sidewall.

15. The vehicle according to claim 14, wherein
the drain includes a drain opening formed in the first sidewall or the second sidewall.

16. The cooler according to claim 7, further comprising
a drain provided at the first sidewall or the second sidewall.

17. The cooler according to claim 16, wherein the drain includes a drain opening formed in the first sidewall or the second sidewall.

18. The vehicle according to claim 1, wherein each of the first handle and the second handle includes a first pivot point and a second pivot point disposed at opposite ends of the handle with respect to each other, the first pivot point being closer to the lid than the second pivot point.

19. The cooler according to claim 7, wherein each of the first handle and the second handle includes a first pivot point and a second pivot point disposed at opposite ends of the handle with respect to each other, the first pivot point being closer to the lid than the second pivot point.

\* \* \* \* \*